United States Patent [19]

Millauer

[11] Patent Number: 4,820,962

[45] Date of Patent: Apr. 11, 1989

[54] ARRANGEMENT FOR AUTOMATIC WORKING DATA SET-UP FOR DRIVING IMPLEMENTS

[75] Inventor: Wolfgang Millauer, Munich, Fed. Rep. of Germany

[73] Assignee: Hilti Aktiengesellschaft

[21] Appl. No.: 114,413

[22] Filed: Oct. 28, 1987

[30] Foreign Application Priority Data

Oct. 31, 1986 [DE] Fed. Rep. of Germany ....... 3637128

[51] Int. Cl.$^4$ ............................................. G05B 19/29
[52] U.S. Cl. ..................................... 318/602; 318/17; 76/108 R
[58] Field of Search ................ 318/602, 17; 76/108 R

[56] References Cited

U.S. PATENT DOCUMENTS

| 3,828,863 | 8/1974 | Bleicher et al. | 173/48 |
| 4,413,936 | 11/1983 | Kuhlmann. | |
| 4,527,449 | 7/1985 | Sydlowski et al. | 76/108 R |
| 4,540,318 | 9/1985 | Hornung et al. | 408/9 |

Primary Examiner—William M. Shoop, Jr.
Assistant Examiner—Saul M. Bergmann
Attorney, Agent, or Firm—Toren, McGeady & Associates

[57] ABSTRACT

Single or multi-track data markings are provided on the shank of a tool bit between a torque transmission region at one end and a working region proper for automatic working data set-up of a driving implement for exchangeable tool bits. The data markings consist of a sequence of notch-like depressions and lands, which are scanned by inductive proximity switch sensors. In case of multi-track codings, one track is used for clock timing. In case of single track codings, an rpm transmitter signal is used as a clock time signal during the information decoding in order to obtain an unequivocal identification signal. Signal evaluation occurs in a microprocessor with at least two counter register combinations, which alternately, in the sequence of the sensor signal, count the pulses of the time clock signal. The respective combination contents are compared in an evaluation unit of the microprocessor with prestored table values. In this way, appropriate driving parameters for each type of tool bit are made available for the motor drive.

11 Claims, 2 Drawing Sheets

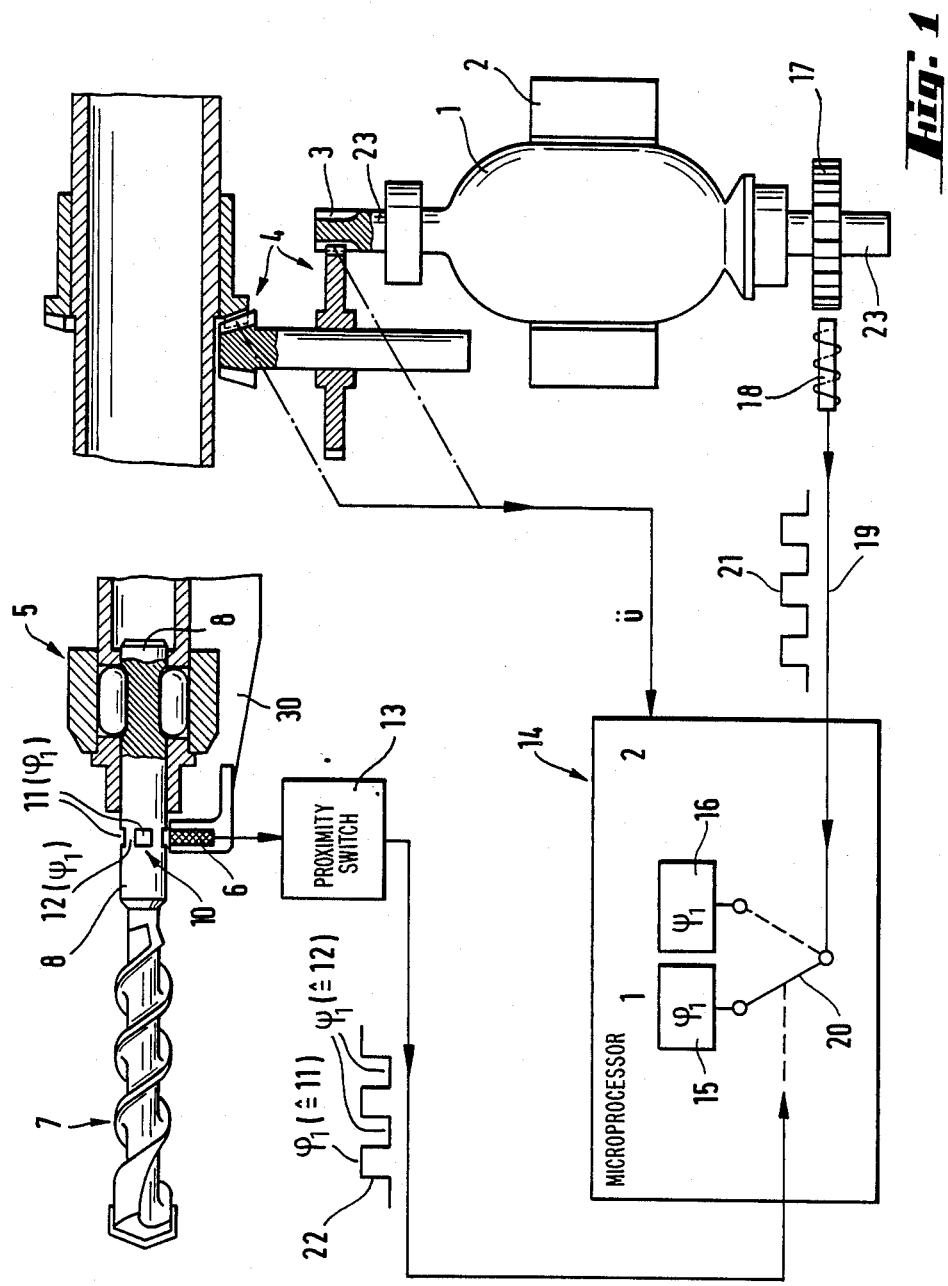

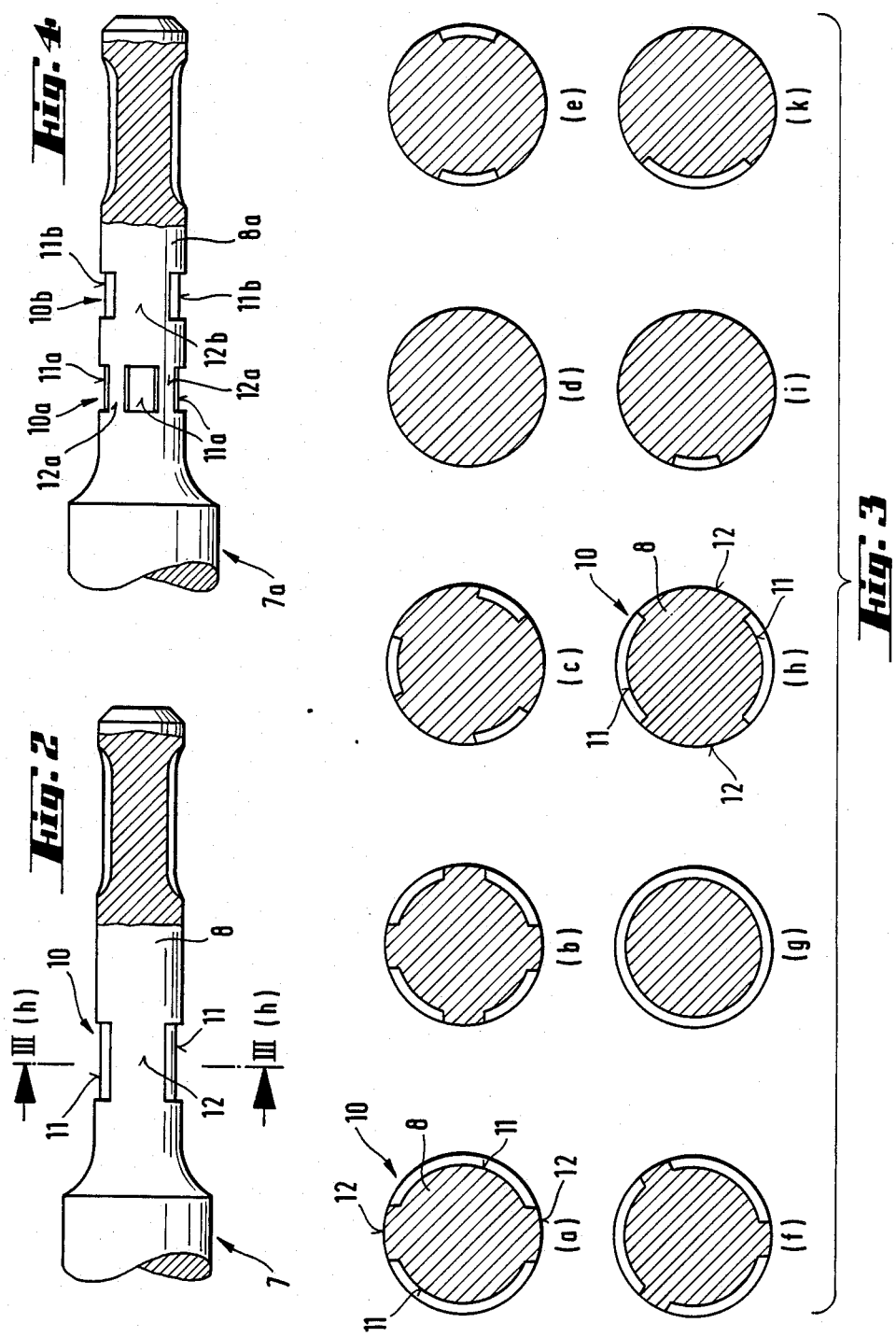

ARRANGEMENT FOR AUTOMATIC WORKING DATA SET-UP FOR DRIVING IMPLEMENTS

BACKGROUND OF THE INVENTION

1. Field of the Invention

The invention relates to an arrangement for automatic working data set-up particular to each type of tool bit for driving implements adapted to various types of exchangeable tool bits.

2. Description of Related Art

Electrical driving implements for tool bits, such as drills, drill hammers, chiselling drills, masonry drills and the like, are known, in which it is left to the operator to adjust the rpm, the cutting speed, the impact frequency, etc., at the driving implement. This could evidently lead to problems if, for example, one forgets, when using a steel drill bit, to reset the driving implement from a drill hammer operation or a chisel operation to a cutting operation. Today's driving implements for the mentioned tool bits are required to be suitable for a wide range of combined utilization possibilities. This, on the other hand, inevitably leads to difficulties if the operator either adjusts the driving implement to an incorrect working condition and/or uses a tool inappropriately in spite of correct operational adjustment, for example, works with too high an rpm or too high an impact frequency.

SUMMARY OF THE INVENTION

An object of the invention is to automatically adjust a driving implement of the above-mentioned type in accordance with the respectively used tool bit so that, apart from, for example, a basic adjustment, such as drilling operation or hammer drill operation. In addition, also certain maximum or minimum limits or other operational parameters, such as rpm, cutting speed and impact frequency, are preset or fixedly adjusted onto fixed operational data.

This object is achieved in an arrangement for the automatic working data set-up of the electrical driving implement particular to each specific tool bit, characterized in that data markings, particular to each type of tool bit, are arranged in the region of the shank of the tool bit in the region serving for retention and actuation connection with the driving implement, and distributed around the circumference of the tool bit; a marking read-out device rigidly built into the tool bit receptacle of the driving implement with respect to the housing of the implement, which read-out device is aligned onto the data markings when the tool bit is inserted into the driving implement, which, in case of relative motion between the tool bit and the driving implement, generates an electrical signal corresponding to the sequence of the data markings on the circumference of the shank; and an electronic evaluation arrangement which receives the electrical signal and, in accordance with such signal, generates appropriate adjustments orders for the adjustment of the drive unit of the driving implement and also appropriate working parameters on the tool bit.

The thrust of the present invention is to transmit working data, such as rpm, cutting speed, percussion frequency of an electrically driven tool, for example, a hammer drill, from the tool bit (for example hard alloy drill bit) directly to the driving implement, in order to be utilized there for the automatic set-up of the appliance to the respective requirements dictated by each specific tool bit. One proceeds herein from the assumption that the relevant working data are to be set up particularly for each tool bit and for operational parameters of the driving implement (motor rpm, etc.).

If these system preconditions are present, then there follows from this the necessity of an automatic set-up of the driving implement to working data defined by the variety of exchangeable tool bits. In addition to imparting these data to the tool bit in a suitable manner (i.e., to mark the tool bit), it is necessary to transmit these data through the geometric interface tool bit/driving implement in an appropriate operational phase and to evaluate or convert these data in the implement in such a way that therefrom, automatically desired values or set-up orders can be formed. In the invention, the geometric interface tool bit/driving implement is constituted by the shank of the tool bit and by the tool bit receptacle, or chuck, in the driving implement.

In one embodiment of the invention, the data markings are applied on the tool bit at the shank, preferably in the area which is located between the "torque transmission region" and the working region proper (for example, a conveyor screw). The data markings are applied around the circumference as one, two or several parallel sequences of notch-like depressions (holes), which are separated by lands.

According to another embodiment, a ring, for example, of metal, is attached to the shank in a suitable manner, the attachment occurring especially by means of an elastic connection, which ring, instead of notches, can also have penetrations, for example, holes or slots. Such a ring can also fulfill additional functions such as dust protection. The ring must be connected with the shank in such a manner that it always rotates together with the tool bit. As far as the directions of motion are concerned, a relative movement between the shank and the ring can be accepted to a limited extent.

The series of indentations and lands distributed around the circumference of the shank is detected by sensors, which, in a preferred embodiment of the invention, operate as inductive proximity switches and are built into the tool bit receptacle of the driving implement in such a way that, respectively, a metal clad coil, open on one side of a high frequency resonant circuit, forming part of this proximity switch principle, has its leakage field directed on, respectively, one of these sequences (also known as data tracks). In a rotating tool bit, for instance a drill bit, the data track or data tracks are moved past and under the coil or coils due to the rotation of the tool bit, wherein a respective depression, or indentation or hole, causes a smaller attenuation of the leakage field than a land positioned between two depressions. Different signal states are assigned to these differing attenuations, which are available at the output of the sensor in the form of electrical alternating signals.

Sensors based on principles other than inductive proximity switches can also be envisaged, to the extent that they are suitable for recognizing the hole/land sequence on the shank. Thus, for example, magnetic sensors which can detect the differing magnetic conductivity of the holes and lands, or optical sensors, for which the holes and lands are interpreted as different degrees of masking of a light beam, may alternatively be used.

Common to all of the above principles of sensors is that the tool bit moves past and below the sensors and the sensors supply a change of signals which corresponds to the image of a change of a hole and a land.

The data evaluation system, and the decoding, in the driving implement is a function of the type of selective coding, and this coding, in turn, is a function of the number of available data tracks. Because of the large differences between single and multi-track codings, they will be discussed separately as follows.

With single track coding, it is, to begin with, impossible, as is known from the data transmission theory, to decode an explicit information out of a pure change of signals without additional information (for example clock timing). It is therefore necessary to use information about the revolution of the tool bit when decoding a single track code. It has been shown to be particularly advantageous, simple and economical to use pulses of a momentary rpm transmitter of the drive motor. Such a momentary rpm transmitter is, in any case, available for other control and regulation purposes in many driving implements of the type under discussion.

Usually, one uses, for this purpose, a magnetic pole wheel with 2 pole pairs (p) installed on the motor shaft, or possibly also on a transmission shaft, which generate an alternating voltage in an induction coil serving as a sensor, or a similar element, for instance, a Hall generator, in which each of the pole pairs corresponds to a period, or each half-wave corresponds to a pole. In other words, each half-wave of this rpm generator signal corresponds to a revolution increment of $1/(2p)$ revolutions, with respect to the motor shaft, or of $1/(2p) \times 1/ü$ revolutions, with respect to the shank, where ü represents the step-down from the motor to the tool bit spindle.

A numerical example illustrates that with a 16 pole magnetic pole wheel and a step-down ratio of 40 between the motor and the tool bit spindle, an incremental resolution of a tool bit revolution into 640 steps is achieved by the rpm transmitter signal, meaning an rpm transmitter pulse equals one step, which equals:

$$\frac{1}{2p(\ddot{u})} = \frac{1}{16(40)} = \frac{1}{640} \text{ revolutions}$$

The signal evaluation can then occur similar to the wide band coding process known in the pertinent technology, by determining across which portion of the revolution under the sensor assigned to the shank, a depression, and across which portion of the revolution, no depression, thus a land, is determined on the shank. By direct comparison of the quantity of respective angle of rotation increments or, according to a suitable mathematical processing (quotient or formation of differences), the information content can be explicitly interpreted. This occurs in actual practice in an advantageous embodiment form of the invention, so that, for instance, a microprocessor counts the rpm transmitter pulses supplied by the magnetic pole wheel sensor into a first register, when the sensor reports a depression at the shank and counts them into a second register when no depression, therefore, a land, is sensed. By direct comparison or by a suitable linkup of the two register contents, for instance, by division or formation of differences, there is generated for each ratio or for each differential value of hole-to-land width on the shank, a fixed assigned result in the computer, which can be explicitly interpreted in a known manner by comparison with stored tables.

If the machine is equipped with a speed change gear, then additional information about the respective position of the switch gear or transmission is required. This is derived from an interrogation to the extent that it does not accrue from the logic of the control, for instance, readout of only one specific gear change mechanism position predetermined by the control in machines operating with automatic switching.

The particular advantage of this type of signal evaluation, if only one data track is used, consists in that the process is, in principle, independent of the rpm, since rotational angle increments are used as a reference value.

If, additionally, the reading clock-time or the counter is monitored onto specific extreme values (overrun /0), then extreme values of a possible coding, such as possibly "no depression exists" or "depression across the entire circumference" (turned groove at the shank), corresponding to the results of the division "0" or "infinity", can be practically evaluated.

The single track coding has the advantage of considerable sturdiness and can be comparatively easily realized without requiring excessively tight tolerances in the fabrication of the tools. The quantity of possible unequivocably distinguishable codings is, however, not only limited by the quantity of the possible depressions and lands placed on the circumference of the shank in actual practice, but rather, it is, above all, determined also by the reading accuracy with which the sensor can recognize the transitions from the depressions to the full material of lands. Depending thereon, a region of lack of accuracy for the coded-out results segregated in groups of tolerances must be allowed.

In case of two or multi-track codings, in which a specific sensor is assigned to each track, the quantity of the possible information contents to be transmitted naturally increases.

With a single track process, the least amount of space is required on the shank and only one sensor is required in the tool bit chuck. On one single shank with a diameter of ten millimeters, it is possible to realize five to seven different coding possibilities depending, respectively, on the security requirements, while decoding and assuring explicit information recognition. The two or multi-track process requires more space on the shank along with two or more sensors. However, one can decode with merely a logic circuit, without the need of a processing unit. It is possible to realize 32 to 64 information units on a shaft diameter of ten millimeters.

Another type of decoding ensures if one of the tracks on the tool bit serves as an incremental transmitter. One can then correspondingly do without rpm pulses derived from an rpm transmitter. In this case, one of the tracks is used as a clock pulse transmitter track, while the other track or tracks serve as information track or tracks. In this case, the information is no longer acquired from the width ratio of the information signals, but rather, logic states (O / L) are assigned to the geometry of the data track, which is interrogated (or are interrogated) at the rhythm controlled by the signal change in the clock time track.

By utilizing only one data track in the sequence of depressions and lands distributed across the circumference of the shank, and by using one sensor in the form of an inductive proximity switch apart from simple fabrication and reliable signal evaluation, also other advantages are achieved in actual practice, which would make it appear that the principle on which this is based, for instance, an optical scanning, is superior. If, for instance, the depressions in the shank are contaminated by dirt, concrete or oil residues, then an optical readout no longer assures an unequivocal information identification. In case of an inductive sensor with an open metal-clad coil, according to the preferred embodiment of the invention, satisfactory information evaluation, and with it an operational data adjustment, is achieved even if the depressions in the shank are filled with dirt.

BRIEF DESCRIPTION OF THE DRAWINGS

With the above and additional objects and advantages in mind as will hereinafter appear, the invention will be described with reference to the accompanying drawings, in which:

FIG. 1 shows, in block diagram form, parts and subassemblies of a driving implement for exchangeable tool bits of the invention, which driving implement is equipped with an arrangement for automatic working data adjustment particular to the respective tool bit;

FIG. 2 shows the shank of a tool bit equipped with a data track;

FIGS. 3a-3k are sectional views of tool shanks, taken, for example, along the line III—III in FIG. 2, showing data marking tracks at for working data adjustment for different types of tool bits; and FIG. 4 shows the shank of a tool bit provided with two data tracks.

DESCRIPTION OF THE PREFERRED EMBODIMENTS

A drive motor with a rotor 1, a stand 2 and a pinion 3, seated on a motor shaft 23, is shown in FIG. 1. Rotation of the pinion 3 is transmitted via gear train 4 (shown only schematically) to a tool bit chuck 5, so that the driving force of the motor is transmitted to the shank 8 of a tool bit 7. The tool bit 7 comprises, between the exposed working region and the torque transmittal region of the shank 8, a predetermined number of depressions 11 distributed around the circumference thereof, which are separated from each other by lands 12. The sequence of depressions 11 and lands 12, as distributed around the circumference, constitutes a data track 10. A sensor 6, in the form of an open metal-clad coil, is aligned with the data track 10, so that when the tool bit rotates, the depressions 11 and lands 12 alternately pass under the sensor 6, which is built into the foremost end of the driving implement housing 30. The sensor 6 constitutes a portion of an inductive proximity switch 13. Proximity switches with inductive sensors are known in the art so that additional explanation is not necessary.

Because of the revolving sequence of depressions 11 and lands 12 of the data track 10, the inductive proximity switch 13 supplies an alternating signal 22, the positive pulses of which, assigned, for instance, to the depressions 11, are designated with the symbol $\phi_1$, while the negative pulses of which, assigned the lands 12, are designated with the symbol $\psi_1$. The alternating signal 22 is applied to an evaluation arrangement, for example, a microprocessor 14, and serves for switching an electronic switch 20, which alternatively activates two counter registers 15 and 16 for a counting and storing operation. The alternating signal 22 is also applied to reset inputs of the counter portions 15.1 and 16.1 of the counter registers 15 and 16, which are reset by, respectively, the leading and trailing edges of the pulses in the alternating signal 22. Depending upon the momentary position of the switch 20, the angle of rotation increments, in the form of pulses of a clock time signal 21, are either read into the counter register 15, for example, in case of a positive pulse of the alternating signal 22, corresponding to $\phi_1$, when the sensor 6 scans the depressions 11, or into the counter register 16 in the case of a negative pulse of the alternating signal 22, corresponding to $\psi_1$, when the sensor 6 scans a land 12. The clock time signal 21, with the angle of rotation increment pulses, is supplied by a sensor 18 through a line 19 forming part of an impuse transmitter. The sensor 18 is aligned with a magnetic pole wheel 17, which is seated on the motor shaft 23 and rotates together with the same. The sensor 18 can be an induction coil or a Hall generator.

For an unequivocal information recognition in the course of the evaluation of the accumulated counter readings in the counter registers 15 and 16, which is described in the following, additionally the gear transmission ratio ü which has been set up is supplied to the microprocessor 14. The counter readings of the counter registers 15 and 16 are assigned directly, or through a recomputation, for example, by calculating the ratio or the difference, to informations which are obtained by comparison with a table of values stored, for example, in a ROM. Herein, a redundant processing, including allowance of "safety zones" for permissible counting values for compensation of tolerances and backlash or play at the tool bit 7 relative to the tool bit chuck 5, is provided.

The signal processing in the microprocessor 14 occurs in accordance with the following program run scheme:

the user actuates the driving implement switch from off to on, read-in occurring whenever the appliance is switched on.

initially, counter register 15 and 16 are reset and after which the counters 15.1 and 16.1 are alternately started and monitored for overrunning.

when changing, for example, from $\psi_1$ to $\phi_1$, the counter 15.1 is reset, started and monitored for overrunning.

when changing from $\phi_1$ to $\psi_1$, the counter 15.1 reading is loaded into the register 15.2, the counter 16.1 is then reset, started and monitored for overrunning.

when changing from $\psi_1$ to $\phi_1$, the counter 16.1 reading is loaded into the register 16.2.

the register readings are then forwarded for signal processing; any counter overrun is also forwarded for processing. An uncoded (conventional) tool bit is recognized from the "overrun value" of the "land" register, the annular groove, from the "overrun value" of the "depression" counter.

for signal processing, the counter register 15 and 16 readings are classified into defined classes $\phi_1$ (n) and $\psi_1$ (n) by comparison with preset class boundaries, wherein the class width corresponds to the leakage width and the class spacing, to the leakage width plus a safety space.

microprocessor 14 interrogates transmission stepdown u and selects an appropriate data field (table) from the ROM.

the working data, corresponding to the respective combinations $\phi_1$ (n) and $\psi_1$ (n), are obtained from a table in the ROM and assigned to a motor rpm n, depending on the transmission stepdown.

the input and signal processing is repeated at least once.

the results of the first run and the second run are compared; in case of identity of the results, transmittal to actuating members of the driving implement, and in case of differences, transmittal of a malfunction signal.

at the start of the working sequence, the required rpm value n is transmitted to the motor regulator.

the transmission stepdown value as set is compared with the required value; if necessary, a switching instruction is triggered for actuation of an actuating magnet for the transmission.

The above explained program run is illustrative only; other program runs being usable with the driving implement of the subject invention.

FIG. 3 shows examples for the design of the sequence of depressions 11 and lands 12 of the data track 10 assigned to a variety of different tool bit types. Thus, the selected patterns of data tracks 10, according to FIG. 3, refer, for example, to the following types of tool bits:

FIGS. 3(a) and 3(h) show two types of chisels;
FIGS. 3(b) and 3(c) show two types of a hammer drill;
FIG. 3(d) shows a tool bit without data markings;
FIG. 3(e) shows a special chisel;
FIG. 3(f) shows a masonry drill;
FIG. 3(g) shows a form work drill (without adjustment, or fixed adjustment);
FIG. 3(i) shows a dowel setting tool; and
FIG. 3(k) shows a freely selectable tool bit often required and to be designated by the driving implement user.

The respective length and the distribution pattern of the sequence of depressions 11 and lands 12, according to FIG. 3, is just one of a plurality of selections taken as an example.

The coding assignment can and will occur, as a rule, so as to satisfy the requirements of the user. Thus, it will be particular to the specific requirement.

A tool bit 7a whose shank 8a carries two axially spaced data tracks 10a and 10b, is shown from FIG. 4. Each data track 10a and 10b is again composed of depressions 11a and 11b and lands 12a and 12b. One data track 10a serves as the clock time transmitter track, while the other data track 10b, as an information track. A sensor in the driving implement for the read out of the coded information is assigned to each data track 10a and 10b.

Numerous alterations of the structure herein disclosed will become apparent to those skilled in the art. However, it is to be understood that the present embodiment is for purposes of illustration only and not to be construed as a limitation of the invention. All such modifications which do not depart from the spirit of the invention are intended to be included within the scope of the appended claims.

What is claimed is:

1. An arrangement for automatic working data set-up particular to each type of tool bit for driving implements adapted to various types of exchangeable tool bits, said arrangement comprising;
   (A) data markings formed on said tool bits indicative of each type of tool bit, said data markings being arranged on a shank of each tool bit in the region serving for retention and actuating connection with the driving implement and distributed around a circumference of said tool bit;
   (B) a marking read-out device built into a tool bit receptacle of the driving implement rigidly mounted to a housing of the implement, said read-out device being aligned with the data markings when the tool bit is inserted into the driving implement, said marking read-out device generating an electric signal corresponding to a sequence of the data markings on the circumference of the shank, when there, is relative motion between the tool bit and the housing; and
   (C) an electronic evaluation arrangement for receiving the electric signal, said electronic evaluation arrangement generating appropriate adjustment orders for adjusting a drive unit of the driving implement for appropriate working parameters of the tool bit.

2. An arrangement according to claim 1, wherein the data markings comprise a sequence of notch-like depressions distributed across the circumference of the shank, said depressions being separated from each other by lands on the shank perimeter, in such a way that a sequence of said depressions and lands constitute at least one circumferential data track; and wherein the marking read-out device comprises at least on inductive sensor built into a tool bit receptacle of the driving implement, which detects the sequence of depressions and lands.

3. An arrangement according to claim 2, wherein the sensor comprises a metal-clad coil aligned to the data track, said sensor being part of a high frequency oscillating circuit.

4. An arrangement according to claim 2 or 3, wherein at least two data tracks and at least two corresponding sensors are provided, and wherein one of the data tracks serves as a clock time transmitter track for establishing a relationship between a speed of motion of said tool bit and the reading of other of said data tracks.

5. An arrangement according to claim 1 or 2, including an impulse transmitter operatively connected to the drive unit of the driving implement and operatively connected to said electronic evaluation arrangement for supplying at least one clock-time signal functioning as a rotational angle reference to said electronic evaluation arrangement.

6. An arrangeent according to claim 5, wherein said impulse transmitter comprises a magnetic pole wheel with a quantity of 2p magnetic poles, p being an integer, integral numbers of said magnetic poles being seated upon a motor shaft of the drive unit, and a second sensor integral with the housing for generating, during revoulations of the magnetic pole wheell, an alternating voltage with a period corresponding to the quantity of the magnetic pole pairs.

7. An arrangement according to claim 6, wherein the second sensor is an induction coil.

8. An arrangement according to claim 6, wherein the second sensor is a Hall generator.

9. An arrangement according to claim 1, wherein the electronic evaluation arrangement comprises two counter register combinations which are alternately activated for counting pulses of a clock time signal, and a switch controlled by said electric signal of the sensor, for alternately activating said counter register combinations, contents of said counter register combinations, achieved at fixed spacings, supplying and order signal for working data adjustment of the driving implement by comparison with stored table values.

10. An arrangement according to claim 1, wherein the electronic evaluation arrangement comprises two counter register combinations which are alternately activated for counting pulses of a clock time signal, a switch, reversible by the electric signal of the sensor, for alternately activating said counter register combinations, contents of said counter register combinations, obtained at fixed time intervals, being divided by each other or subtracted from each other, the result thereof being supplied as an order signal for working data adjustment of the driving implement by comparison with stored table values.

11. An arrangement according to claim 9 or 10, wherein said driving implement comprises transmission ratios switchable by a switch gear unit, and said arrangement includes selectively dialable comparative tables depending on the transmission position.

* * * * *